US006034860A

United States Patent [19]

Shea

[11] Patent Number: 6,034,860

[45] Date of Patent: Mar. 7, 2000

[54] CIRCUIT BREAKING CONTACT WITH MICRO-CONTACT INTERFACE

[75] Inventor: John J. Shea, Pittsburgh, Pa.

[73] Assignee: Eaton Corporation, Cleveland, Ohio

[21] Appl. No.: 09/095,489

[22] Filed: Jun. 10, 1998

[51] Int. Cl.[7] .......... H02H 3/00

[52] U.S. Cl. .......... 361/102; 335/127; 335/201; 200/279; 218/5

[58] Field of Search .......... 361/42, 102, 115, 361/93; 200/19 A, 10, 270, 275, 279; 218/2–7, 16, 30, 48, 146; 335/106–107, 127, 196, 201; 307/131, 132 R

[56] References Cited

U.S. PATENT DOCUMENTS

| | | | |
|---|---|---|---|
| 2,490,020 | 12/1949 | Enzler | 200/279 |
| 3,562,466 | 2/1971 | McElligott | 200/511 |
| 4,307,507 | 12/1981 | Gray et al. | 29/580 |
| 4,544,811 | 10/1985 | Brevick | 200/5 R |
| 5,220,725 | 6/1993 | Chan et al. | 29/874 |
| 5,430,597 | 7/1995 | Bagepalli et al. | 361/93 |
| 5,563,756 | 10/1996 | Ignasiak | 361/42 |

*Primary Examiner*—Michael J. Sherry
*Attorney, Agent, or Firm*—Martin J. Moran

[57] ABSTRACT

Opening electrical contacts or electrical circuit interrupters. Particularly, a design for an electrical switch having opening electrical contacts which inhibit arcing. More particularly, a circuit breaker having a micro-contact interface comprising a contact with a plurality of contact points capable of handling high steady state currents conventionally handled by small to medium size molded case circuit breakers (i.e., 0.5 $A_{rms}$ to 400 $A_{rms}$) at distribution voltage levels (120 $V_{rms}$ to 600 $V_{rms}$).

11 Claims, 4 Drawing Sheets

CIRCUIT BREAKING CONTACT WITH MICRO-CONTACT INTERFACE

FIELD OF THE INVENTION

This invention relates to opening electrical contacts or electrical circuit interrupters. Particularly, the invention relates to a design for an electrical switch having opening electrical contacts which inhibit arcing. More particularly, the invention relates to a circuit breaker having a micro-contact interface comprising a contact with a plurality of contact points capable of handling the high steady state currents conventionally handled by small to medium size molded case circuit breakers (i.e., 0.5 $A_{rms}$ to 400 $A_{rms}$) at distribution voltage levels (120 $V_{rms}$ to 600 $V_{rms}$).

BACKGROUND OF THE INVENTION

Our modern day civilization depends heavily upon a supply of electrical energy to perform a multitude of tasks. The supply of electrical energy, however, must be controlled, and in many cases instantaneously. One method of controlling the supply of electrical energy is through the use of opening electrical contacts or make-and-break contact devices.

Make-and-break contact devices are designed for and used in a variety of forms for various applications. These devices may be small switches or relays which are actuated by tiny forces and which carry small currents, or they may comprise large units requiring great forces to actuate them and which are capable of carrying enough current to light a city. Similarly, the actual contacts incorporated into these devices may vary from small rivets of pin-head size to large contactors comprising several pounds of material.

Conventional make-and-break contact devices, under normal current conditions, facilitate electrical connection between two contacts by bringing them into physical contact such that an ohmic connection is made. Under fault current conditions, conventional make-and-break contact devices move the contacts apart breaking the ohmic connection.

In conventional make-and-break contact devices, there are two forces that operate on the contacts during a fault current condition, namely a magnetic repulsion and a gas force. Specifically, when a conventional make-and-break contact device is subjected to a fault current, a magnetic repulsion force is created by the flow of current through the contacts. This magnetic repulsion force acts to separate the contacts. Typically, contact pairs will consist of a spring-loaded moving contact and a stationary contact. Under normal current conditions, the spring force exerted on the contacts will be much greater than the magnetic repulsion force generated by the flow of electricity through the contacts. Notwithstanding, there is a current at which the magnetic repulsion force will match the spring force. When the current exceeds this value, the contacts will part.

If the current and voltage are high enough, an arc will form between the contacts. Once the contacts separate and arcing commences, a second force, namely the gas force, will act upon the contacts. This gas force derives from the ionization of the air and other materials in the arc chamber which temporarily increases the pressure between the contacts.

In conventional make-and-break contact devices, the contacts may be operated many times without appreciable wear provided no current is being carried. When current is being interrupted, however, significant changes in the contact surfaces may occur. Generally, arcing will cause the transfer of material from the negative contact to the positive contact. Also, oxidation of the contact surfaces may result from the energy expended between the contacts during arcing. These changes in the contact surfaces will eventually affect the reliability of the make-and-break device requiring its replacement.

In addition, as long as an arc bridges the gap between separating contacts, current will continue to flow through the make-and-break device. This continued flow of current is termed a let-through current. As long as the voltage across the contacts exceeds the arc voltage, the arc will continue to burn and current will continue to flow though the device.

What is needed are make-and-break contact devices which inhibit arcing associated with conventional devices. What is also needed are make-and-break contact devices which rapidly open the circuit and inhibit let-through currents.

SUMMARY OF THE INVENTION

The present invention provides designs for electrical contacts which inhibit arc formation conventionally associated with electrical contacts. The concepts of the invention can be incorporated into circuit breaker designs, especially molded case circuit breakers and miniature circuit breakers. Incorporation of the concepts of the invention allow for the elimination of conventional arc chute/arc chamber assemblies from circuit breaker designs. Other applications for the concepts of the invention potentially include arc-less brushes for motors, lighting switches, motor operator switches, and other types of arcing switches.

In accordance with the invention, separable contacts which inhibit arcing are provided.

In accordance with the invention, make-and-break electrical devices which inhibit let-through currents are provided.

In accordance with the invention, separable contacts are provided comprising a fixed contact and a moveable contact for opening and closing against the fixed contact and cooperatively arranged to provide current flow through the contacts from a source to a load; wherein one of the fixed contact and the moveable contact has a contact surface comprising a plurality of contact points, wherein each said contact point conducts a portion of the current flowing through the contacts.

In accordance with the invention, contacts are provided having a contact surface comprising a plurality of dielectric wells, wherein each dielectric well has one contact point disposed therein.

In accordance with the invention, contacts are provided comprising a resilient conductive material for mating with a contact comprising a plurality of contact points.

In accordance with the invention, electrical switches are provided which comprise a contact having a plurality of contact points which inhibit arc formation.

In accordance with the invention, circuit breakers are provided for use with voltages up to and including 600 $V_{rms}$.

In accordance with the invention, circuit breakers are provided having a contact with a contact surface comprising a plurality of contact points wherein the maximum current conducted by each contact point can range up to 1.4 A depending on the contact material chosen.

In accordance with the invention, load circuits are provided having a maximum load current of 400 $A_{rms}$ with a maximum steady state voltage of 600 $V_{rms}$ in combination with a circuit breaker having contacts which inhibit arcing.

One aspect of the invention resides in an electrical switch, comprising: (a) a pair of separable contacts, comprising: (a.1) a fixed contact, and (a.2) a moveable contact for opening and closing against the fixed contact and cooperatively arranged to provide current flow through the electrical switch from a source to a load; wherein one of the fixed contact and the moveable contact has a contact surface comprising a plurality of contact points, wherein each said contact point conducts a portion of the current flowing through the electrical switch.

Another aspect of the invention resides in a circuit breaker, comprising: (a) a pair of separable contacts, comprising: (a.1) a fixed contact, and (a.2) a moveable contact for opening and closing against the fixed contact and cooperatively arranged to provide current flow through the circuit breaker from a source to a load; wherein one of the fixed contact and the moveable contact has a contact surface comprising a plurality of contact points, wherein each said contact point conducts a portion of the current flowing through the circuit breaker; (b) a current flow sensing means for detecting the magnitude of a current flowing through the circuit breaker; (c) an actuation means for moving the moveable contact to open and close the separable contacts; and, (d) a trigger mechanism for energizing the actuation means when the current flow sensing means detects that the current flowing through the circuit breaker exceeds a critical value; wherein the portion of the current flowing through each individual contact point at the critical value is less than a minimum arcing current for the materials of which the fixed contact and the movable contact are comprised.

Another aspect of the invention resides in a load circuit having a maximum load current of 400 $A_{rms}$ with a maximum steady state voltage of 600 $V_{rms}$ in combination with a circuit breaker, comprising: (a) a pair of separable contacts, comprising: (a.1) a fixed contact, and (a.2) a moveable contact for opening and closing against the fixed contact and cooperatively arranged to provide current flow through the circuit breaker from a source to a load; wherein one of the fixed contact and the moveable contact has a contact surface comprising a plurality of contact points, wherein each said contact point conducts a portion of the current flowing through the circuit breaker; (b) a current flow sensing means for detecting the magnitude of a current flowing through the circuit breaker; (c) an actuation means for moving the moveable contact to open and close the separable contacts; and, (d) a trigger mechanism for energizing the actuation means when the current flow sensing means detects that the current flowing through the circuit breaker exceeds a predetermined threshold; wherein the current flowing through the individual contact points at the maximum current load is less than a minimum arcing current for the materials of which the fixed contact and the movable contact are comprised.

Another aspect of the invention resides in a method for producing a contact having a contact surface with a plurality of contact points, comprising: (a) gathering a plurality of strands of insulated wire into a bundle; (b) inserting the bundle into a sleeve comprised of an electrically insulating material or alternatively wrapping an electrically insulating material about the bundle; (c) filling the interstices between and around the individual strands of insulated wire within the sleeve or wrap with an electrically insulating binder; (d) stripping the insulation from a first end of the plurality of strands of insulated wire, exposing a plurality of bare wire projections; (e) filling the interstices between and around the bare wire projections with an electrically conductive material; (f) providing a substantially flat surface at a second end of the plurality of strands of insulated wire; (g) applying a uniform layer of electrically insulating material to the substantially flat surface; and, (h) etching openings through the uniform layer, exposing a plurality of contact points at the second end of the plurality of strands of insulated wire.

These and other advantages of the invention will become more apparent in connection with the following description of certain embodiments of the invention as disclosed in non-limiting examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims. In the drawings.

DETAILED DESCRIPTION OF THE PREFERRED EMBODIMENTS OF THE INVENTION

The following detailed description is of the best presently contemplated mode of carrying out the invention. The description is not intended in a limiting sense, and it is made solely for the purpose of illustrating the general principles of the invention. The various features and advantages of the present invention may be more readily understood with reference to the following detailed description taken in conjunction with the accompanying drawings.

The concepts of the invention comprise electrical devices which are characterized by contacts which inhibit arc formation and let-through currents. The concepts of the invention are manifested by an electrical device having at least one contact with a contact surface having a plurality of contact points. Each one of these contact points will conduct a portion of the current flowing through the electrical device. The actual number of contact points provided on the contact surface depends upon the design circuit conditions under which the electrical device incorporating the contact will be subjected, namely the steady state voltage, the steady state current and the potential short circuit fault current.

An arc will form between separating contacts if the minimum arcing current and the minimum arcing voltage are exceeded. Those skilled in the art know how to assess the minimum arcing current and the minimum arcing voltage as well as the relationship therebetween for contacts comprising any given materials of construction.

For example, Table 1 lists the minimum arcing voltages for various materials and Table 2 gives some minimum arcing currents. Table 1 and Table 2 both comprise data disclosed in MALLORY ELECTRICAL CONTACT DATA BOOK at page 41.

TABLE 1

| CONTACT MATERIAL OF CONSTRUCTION | MINIMUM ARCING VOLTAGE (in volts) |
|---|---|
| Tungsten | 16.5 |
| Platinum | 16.0 |
| Gold | 15.0 |
| Silver | 11.8 |
| Silver-30% Palladium | 13.0 |
| Copper | 12.4 |
| Carbon, Graphite | 18.0 |
| Iron | 13.5 |
| Zinc | 11.2 |
| Cadmium | 10.0 |

TABLE 2

| ANODE MATERIAL OF CONSTRUCTION | CATHODE MATERIAL OF CONSTRUCTION | MINIMUM ARCING CURRENT (in $Amps_{dc}$) |
|---|---|---|
| Copper | Copper | 0.70 |
| Zinc | Zinc | 0.05 |
| Tungsten | Tungsten | 1.40 |
| Silver | Silver | 0.40 |
| Graphite | Graphite | 0.08 |
| Copper | Zinc | 0.13 |
| Zinc | Copper | 0.50 |
| Tungsten | Silver | 0.80 |
| Silver | Tungsten | 0.40 |
| Tungsten | Graphite | 0.12 |
| Graphite | Tungsten | 0.80 |

It may be ascertained from the data presented in Tables 1 & 2 that the use of different materials of construction for a pair of separable contacts will affect the minimum arcing voltage for the pair.

Figure 1:
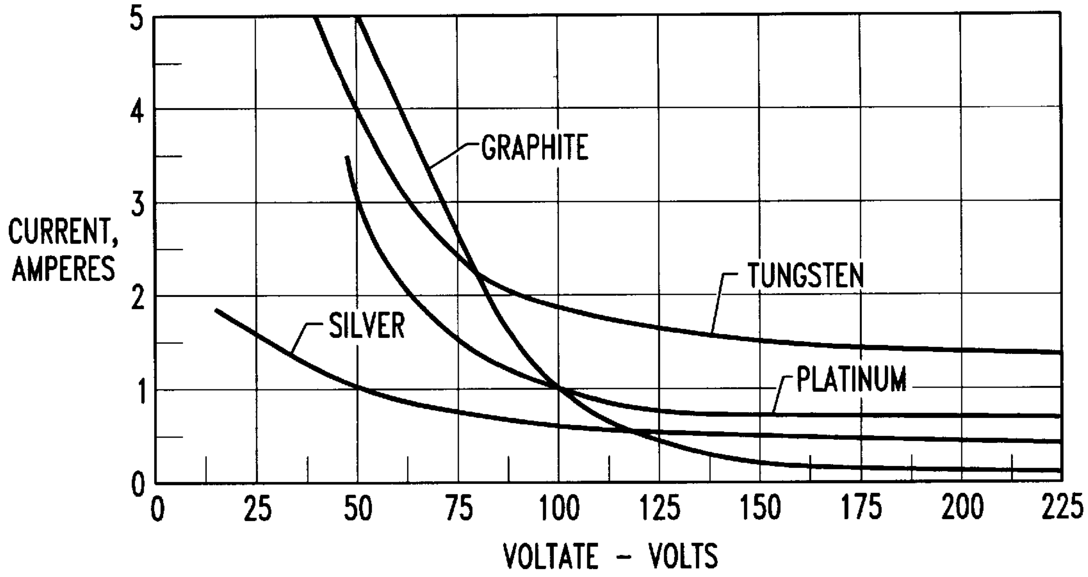
FIG. 1 is a graph showing the minimum arcing current as a function of the voltage across separable contacts, wherein both contacts are comprised of the same material selected from the group comprising tungsten, platinum, silver and graphite.

Those skilled in the art will know how to interrelate the minimum arcing current and voltage under specific environmental conditions, i.e, pressure, temperature and the dielectric material between the contacts when separated, for the materials of construction for a given pair of contacts. For example, FIG. 1 provides a graphical representation of the relationship between the minimum arcing current and voltage in air at atmospheric conditions for contact pairs wherein both contacts are comprised of either tungsten, platinum, silver or graphite. The curves shown in FIG. 1 specifically show the amount of current that may be interrupted at a given voltage without arcing.

Accordingly, a sufficient number of contact points should be provided such that the portion of the current conducted through each point under the design circuit conditions for the device will not exceed a characteristic minimum arcing current for the materials from which the contacts are constructed.

Figure 2:
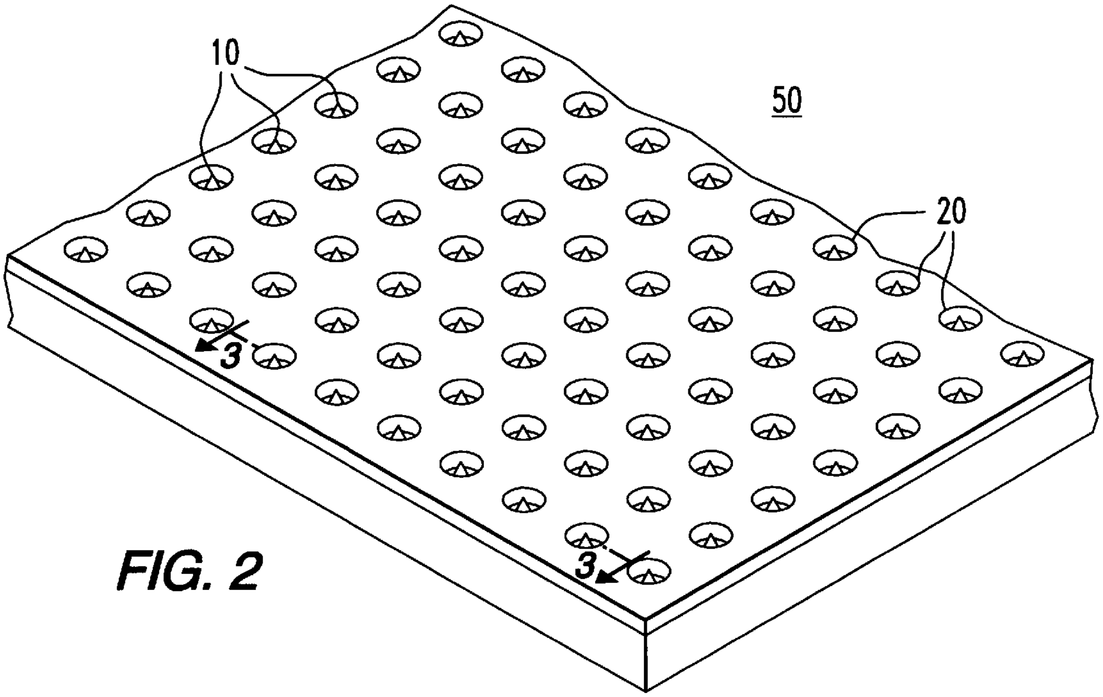
FIG. 2 is a depiction of a top perspective view of a contact of the invention with a contact surface having a plurality of contact points and a plurality of dielectric wells, wherein each contact point is disposed within a dielectric well.
Figure 3:
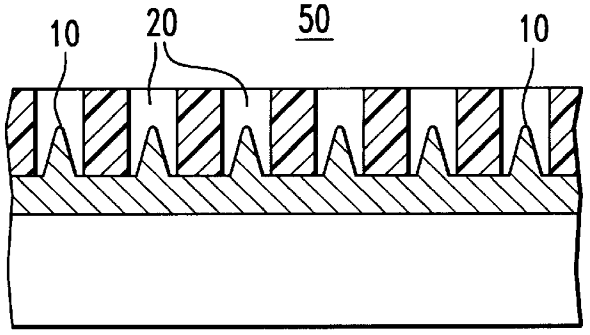
FIG. 3 is a depiction of an elevational view of a contact of the invention with a contact surface having a plurality of contact points and a plurality of dielectric wells, wherein each contact point is disposed within a dielectric well.

Furthermore, each individual contact point (10) on the contact (50) may be disposed within a dielectric well (20) as depicted in FIGS. 2 & 3. The dielectric wells isolate each individual contact point from its neighbors, thereby inhibiting breakdown between adjacent wires.

The dielectric well may be made from virtually any dielectric material which is compatible with the contact material. Preferably, the dielectric well is made from an insulating material that can be easily applied to the contact surface using methods such as spin coating or sputter deposition. Most preferably, the dielectric well is made from an insulating material selected from the group comprising thermoplastics, such as polyethylene and polypropylene; and thermosetting resins, such as epoxy resins, polyester resins and polyamide resins. The specific material chosen must have a high dielectric strength, high thermal and mechanical stability and should be easily corona etched. Those skilled in the art will know how to select compatible materials of construction for the dielectric well and the contact.

Figure 4:
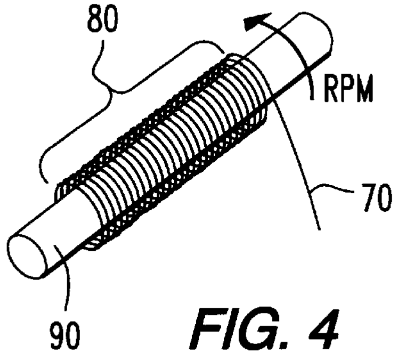
FIG. 4 is a depiction of an insulated wire being wound into a coil on a mandrel.
Figure 5:
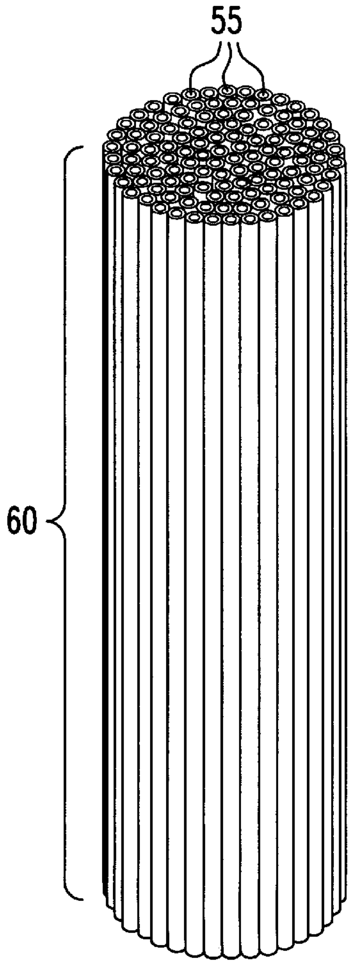
FIG. 5 is a depiction of a bundle comprising a plurality of strands of insulated wire.
Figure 6:
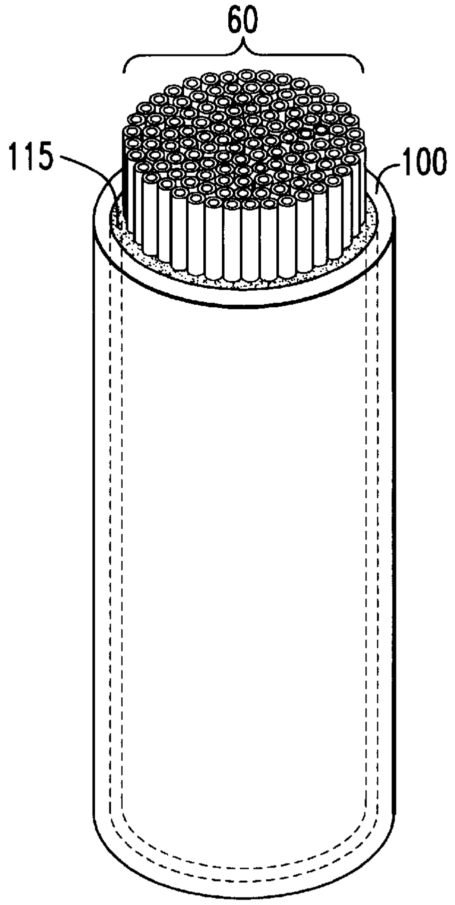
FIG. 6 is a depiction of the bundle of FIG. 5 inserted into a tubular sleeve.
Figure 7:
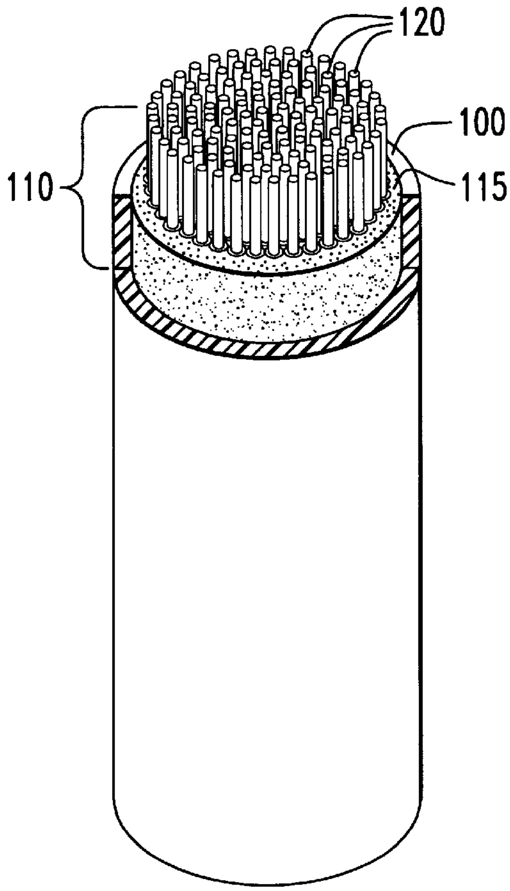
FIG. 7 is a depiction of a plurality of strands of insulated wire in a bundle with the insulation removed from a first end to expose a plurality of bare wire projections.
Figure 8:
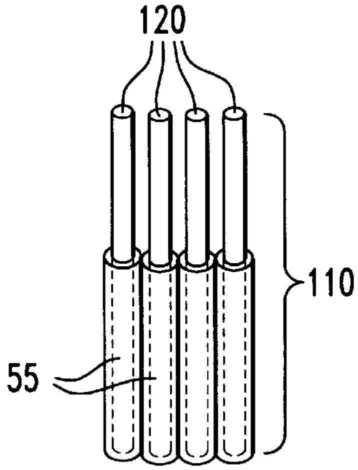
FIG. 8 is a blown up detail of a portion of FIG. 7.
Figure 9:
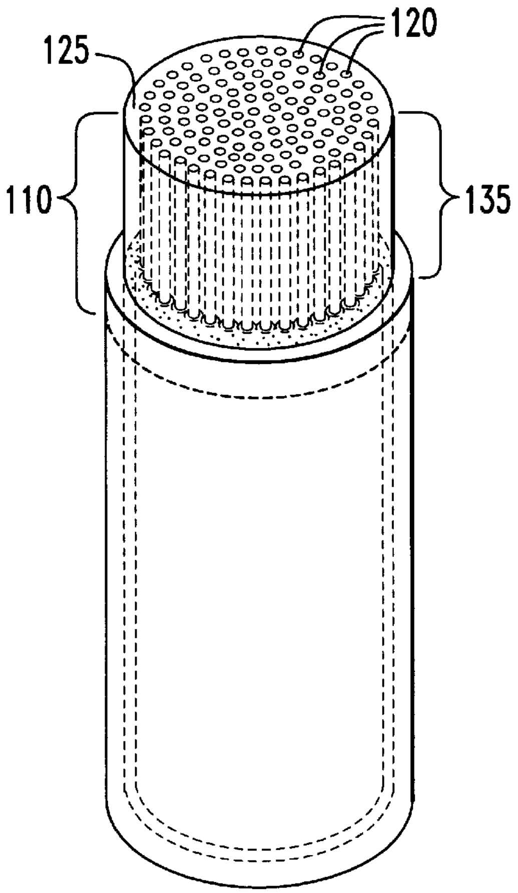
FIG. 9 is a depiction of the plurality of strands of insulated wire in a bundle of FIG. 8 wherein the interstices between and around the exposed plurality of bare wire projections have been filled with an electrically conductive material.
Figure 10:
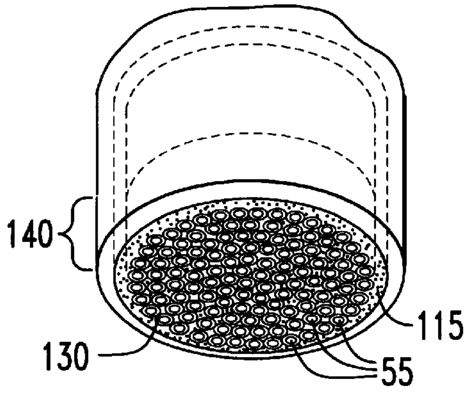
FIG. 10 is a depiction of a bundle with a flattened second end.
Figure 11:
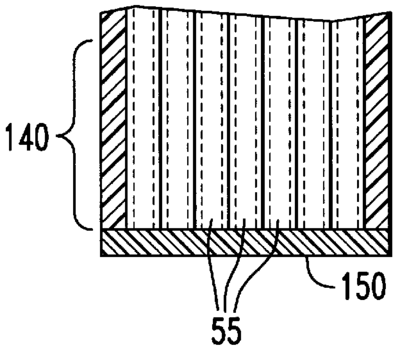
FIG. 11 is a depiction of a bundle having a thin layer of dielectric material coated onto the flattened second end of the bundle of FIG. 11.
Figure 12:
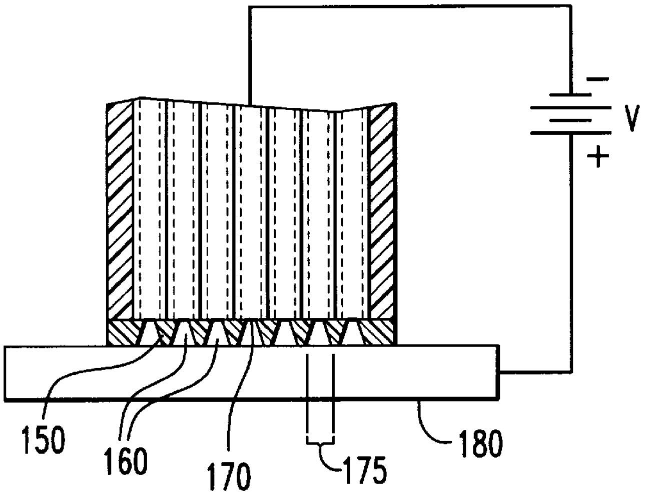
FIG. 12 is a depiction of a bundle being etched to form dielectric wells; and, FIG. 13 is a blown up detail of a portion of FIG. 12; and, FIG. 14 is a depiction of an elevational view of a contact pair of the invention wherein one contact has a contact surface with a plurality of contact points and a plurality of dielectric wells, wherein each contact point is disposed within a dielectric well and the other contact comprises a resilient material which may deform to conform to the surface of its mate.
Figure 13:
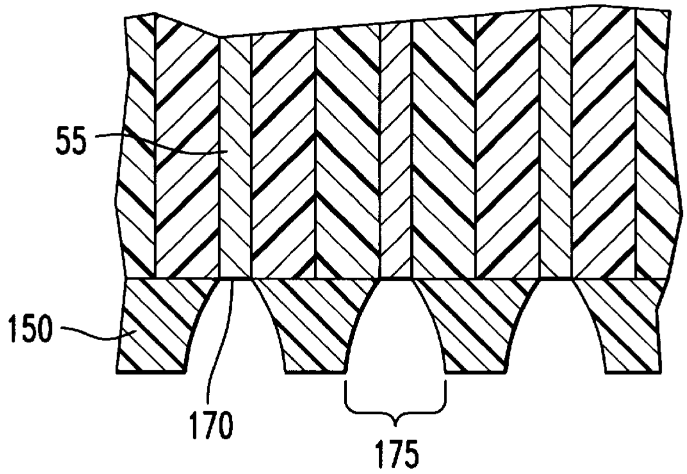

One method for fabricating a contact surface of the present invention comprising a plurality of contact points is as follows:

(a) gathering a plurality of strands of insulated wire (55) into a bundle (60) by, for example, (i) winding an insulated wire (70) into a coil (80) on a mandrel (90), (ii) optionally applying a binder (not shown) to the insulated wire during winding to hold the individual turns of the coil together, (iii) cutting the coil of wire from the mandrel along a line parallel to the axis of the coil and (iv) straightening the resulting plurality of strands of insulated wire (55), see FIGS. 4 & 5;

(b) inserting the bundle (60) into a sleeve (100) made of electrically insulating material, preferably a cylindrical tube of electrically insulating material, see FIG. 6, or, alternatively, wrapping an electrically insulating material about the bundle;

(c) filling the interstices between and around the individual strands of insulated wire (55) disposed within the sleeve (100) or wrap with an electrically insulating binder (I15), such as a polymer resin, a thermoplastic, or an organic glue, see FIG. 6;

(d) stripping the insulation from a first end (110) of the bundle (60) to expose a plurality of bare wire projections (120), see FIGS. 7 & 8, by, for example, dipping the first end into a solvent capable of dissolving the insulation, subjecting the first end to a source of heat to melt away the insulation, using mechanical means to remove the insulation;

(e) filling the interstices between and around the bare wire projections with an electrically conductive material (125), see FIG. 9, by, for example, melt flow soldering or brazing material over the exposed plurality of bare wire projections (120) to form a solid electrically conducting mass (135) at the first end (110);

(f) providing a substantially flat surface (130) at a second end (140) of the plurality of strands of insulated wire (55) by, for example, cutting away a portion of the sleeve or wrap and the bundle and, optionally, polishing the substantially flat surface; preferably, the substantially flat surface should reside along a plane substantially perpendicular to the axes of the plurality of strands of insulated wire, see FIG. 10;

(g) applying a uniform layer of electrically insulating material (150) to a second end (140) of the plurality of strands of insulated wire (55), see FIG. 11, by, for example, using known spin coating techniques to apply a uniform coating of a polymer having a high dielectric strength and a high thermal resistance such as polyimides, i.e., KAPTON®, epoxy resins, thermoset polymers, and thermoplastics; and, (h) etching openings (160) through the uniform layer exposing a tip (170) of each of the wire strands in the plurality of strands of insulated wire (55), each tip comprising a contact point, and creating a dielectric well (175) associated with each tip (170) by, for example, using known corona etching techniques by applying a voltage across the uniform layer between the plurality of strands of insulated wires and a ground plane (180), see FIGS. 12 & 13.

Using the concepts of the present invention, electrical devices having separable contacts may be produced which will require very little energy to operate. This is due to the low contact force needed to keep the contacts together under steady state conditions and the ability to incorporate smaller less massive contacts into the electrical devices using the concepts of the present invention.

These and other advantages of the present invention will become more apparent in connection with the following description of certain embodiments of the invention as disclosed in non-limiting examples.

In one embodiment, the present invention comprises electrical switches characterized by having a contact which inhibits arc formation. Specifically, the electrical switch, comprises: (a) a pair of separable contacts, comprising: (a.1) a fixed contact, and (a.2) a moveable contact for opening and closing against the fixed contact and cooperatively arranged so as to provide current flow through the electrical switch from a source to a load; wherein one of the fixed contact and the moveable contact has a contact surface comprising a plurality of contact points, wherein each said contact point conducts a portion of the current flowing through the electrical switch. The electrical switches incorporating the concepts of the present invention may preferably be selected from the group comprising molded case circuit breakers, miniature circuit breakers, motor brushes, lighting switches and motor operator switches.

The contact having a contact surface comprising a number of contact points is preferably comprised of silver, tungsten, molybdenum, nickel, cadmium, carbon, silver tin oxide, silver cadmium oxide, silver tungsten, silver tungsten carbide, silver carbide, or any mixture thereof.

The electrical switches of the present invention may preferably comprise a contact with a contact surface having a plurality of contact points and a plurality of dielectric wells, wherein each dielectric well has one contact point disposed therein.

Figure 14:
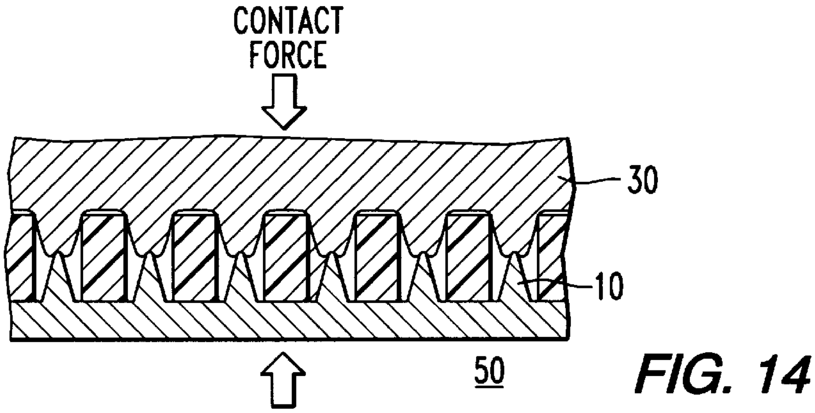

Preferably, the contact that mates with the contact surface comprising a number of contact points (10) will comprise a resilient conductive material (30), as depicted in FIG. 14. Specifically, the one of the fixed contact and the moveable contact which does not have a contact surface comprising a plurality of contact points preferably comprises a resilient conductive material. The resilient conductive material will conform to the contact surface comprising a plurality of contact points such that it is not critical that all of the contact points be of exactly the same height.

The resilient conductive material preferably comprises a conductive elastomer, most preferably conductive rubber. Furthermore, the conductive elastomer may contain conductive nickel powder, carbon black, silver powder or blends thereof. The conductive elastomer may also contain conductive metal coated glass spheres to enhance its electrical conductivity, for example, silver coated glass spheres.

Alternatively, the plurality of dielectric wells comprise recesses in a thin layer of dielectric material, preferably about 50 mm thick, wherein the dielectric layer is resiliently flexible allowing the individual contact points to make contact with a substantially rigid mating contact with reasonable contact forces pressing the mating contacts together, preferably the contact forces will be between 1 to 30 pounds per square inch.

The electrical switches of the present invention may preferably be designed to operate with voltages up to and including 600 $V_{rms}$, wherein the maximum current across each individual point can be as high as 1.4 A depending on the materials used.

In another embodiment, the present invention provides circuit breakers, preferably circuit breakers having a microcontact interface, characterized by having a contact which inhibits arc formation. Specifically, the present invention provides circuit breakers comprising: (a) a pair of separable contacts, comprising: (a.1) a fixed contact, and (a.2) a moveable contact for opening and closing against the fixed contact and cooperatively arranged so as to provide current flow through the circuit breaker from a source to a load; wherein one of the fixed contact and the moveable contact has a contact surface comprising a plurality of contact points, wherein each said contact point conducts a portion of the current flowing through the circuit breaker; (b) a current flow sensing means for detecting the magnitude of a current flowing through the circuit breaker; (c) an actuation means for moving the moveable contact to open and close the separable contacts; and (d) a trigger mechanism for energizing the actuation means to open the separable contacts when the current flow sensing means detects that the current flowing through the circuit breaker exceeds a critical value; wherein the portion of the current flowing through each individual contact point at the critical value is less than a minimum arcing current for the materials of which the fixed contact and the movable contact are comprised.

The contact having a contact surface comprising a plurality of contact points is preferably comprised of silver, tungsten, molybdenum, nickel, cadmium, carbon, silver tin oxide, silver cadmium oxide, silver tungsten, silver tungsten carbide, silver carbide, or any mixture thereof.

Preferably, the contact that mates with the contact surface comprising a plurality of contact points will comprise a resilient conductive material. Specifically, the contact, which engages the contact having a contact surface comprising a plurality of contact points, preferably comprises a resilient conductive material. The resilient conductive material will conform to the contact surface comprising a plurality of contact points such that it is not critical that all of the contact points be of the same height.

The resilient conductive material preferably comprises a conductive elastomer, most preferably conductive rubber.

Furthermore, the conductive elastomer may contain conductive nickel powder, carbon black, silver powder or blends thereof. The conductive elastomer may also contain metal coated glass spheres to enhance its electrical conductivity, for example, silver coated glass spheres.

Alternatively, the plurality of dielectric wells comprise recesses in a thin layer of dielectric material, preferably about 50 mm thick, wherein the dielectric layer is resiliently flexible allowing the individual contact points to make contact with a substantially rigid mating contact with reasonable contact forces pressing the mating contacts together, preferably the contact forces will be between 1 to 30 pounds per square inch.

The current flow sensing means for detecting the magnitude of the current flowing through the circuit breaker may comprise known means such as a current transformer, a resistance shunt, or rely on electromechanical sensing and actuation such as magnetic attraction or repulsion forces (i.e., magnet/armature in circuit breaker or reverse loop repulsion force).

The actuation means for moving the moveable contact to open and close the circuit breaker may preferably comprise a mechanical actuator. Mechanical actuators suitable for use with the present invention are known in the art.

The trigger mechanism is designed to energize the actuation means when the current flow sensing means detects that the current flowing through the circuit breaker exceeds a critical value for a given voltage across the contacts. Trigger mechanisms suitable for use with the present invention are known in the art. For example, magnetic holding trigger mechanisms are suitable for use with the present invention. Known magnetic holding trigger mechanisms couple a permanent magnet with a spring, wherein the permanent magnet forces the mating contacts together while the spring forces the mating contacts apart. The force generated by the permanent magnet exceeds the force generated by the spring. However, the flow of current through the mating contacts generates a magnetic field that opposes that generated by the permanent magnet. The magnitude of the current generated magnetic field increases with an increase in the magnitude of the current flowing through the mating contacts. The permanent magnet and the spring are selected such that the combined force of the spring and the current generated magnetic field will exceed the force generated by the permanent magnet when a predetermined threshold current through the mating contacts is exceeded. Hence, the combined force of the spring and the current generated magnetic field will cause the mating contacts to part when the threshold current is exceeded.

Another trigger mechanism suitable for use with the present invention comprises known bimetal or shaped memory alloy mechanisms. Such mechanisms comprise a bimetal or shaped memory alloy connected to the moveable contact. The bimetal or shaped memory alloy operates to force the mating contacts together under normal circuit conditions. However, when the current passing through the contacts exceeds a predetermined threshold the bimetal or shaped memory alloy will operate to separate the contacts. Namely, the shape of the bimetal or shaped memory alloy is temperature dependent. The flow of current therethrough generates thermal energy by resistive heating. The magnitude of the thermal energy generated increases with an increase in current. Hence, when the current passing through the bimetal or shaped memory alloy exceeds a predetermined threshold the thermal energy generated thereby through resistive heating will raise the temperature of the alloy changing its shape, separating the contacts. Upon cooling, the bimetal or shaped memory alloy will return to its normal shape closing the contacts.

The circuit breakers of the present invention can operate with voltages up to and including 600 $V_{rms}$, wherein the maximum current across each individual point is up to 10 mA.

The circuit breakers of the present invention preferably comprise a contact with a contact surface having a plurality of contact points further comprising a plurality of dielectric wells, wherein each dielectric well has one contact point disposed therein.

In another embodiment, the present invention provides a load circuit having a maximum load current of 400 $A_{rms}$ with an accompanying maximum steady state voltage of 600 $V_{rms}$ in combination with a circuit breaker of the present invention which is characterized by having a contact which inhibits arc formation.

The present invention having been disclosed in connection with the foregoing embodiments, additional embodiments will now be apparent to persons skilled in the art. The present invention is not intended to be limited to the embodiments specifically mentioned, and accordingly reference should be made to the appended claims rather than the foregoing discussion, to assess the spirit and scope of the present invention in which exclusive rights are claimed.

We claim:

1. An electrical switch for interrupting current in a load circuit, comprising:

(a) a pair of separable contacts, comprising:

(a.1) a fixed contact, and (a.2) a moveable contact for closing against the fixed contact to provide a total current flow through the electrical switch from a source to a load and for opening away from said fixed contact to interrupt said total current flow;

one of the fixed contact and the moveable contact having a contact surface comprising a plurality of contact points and a layer of dielectric material on said contact surface forming a dielectric well around each contact point, said contact points contacting the other of said fixed contact and moveable contact with said pair of separable contacts closed so that each contact point conducts a portion of the total current flow through the electrical switch, said plurality of contact points being such that said portion of the total current flow through each contact point is less than a minimum arcing current for materials of which said fixed contact and moving contact are comprised.

2. The electrical switch of claim 1, wherein the electrical switch is at least one of a circuit breaker, a motor brush, a lighting switch, and a motor operator switch.

3. The electrical switch of claim 1, wherein the one of the fixed contact and the moveable contact which does not have a contact surface comprising a plurality of contact points comprises a resilient conductive material.

4. The electrical switch of claim 3, wherein the resilient conductive material comprises a conductive elastomer.

5. The electrical switch of claim 3, wherein the resilient conductive material comprises conductive rubber.

6. The electrical switch of claim 4, wherein the conductive elastomer contains at least one of conductive nickel powder, carbon black, silver powder and blends thereof.

7. The electrical switch of claim 4, wherein the conductive elastomer contains silver coated glass spheres.

8. The electrical switch of claim 1, wherein the electrical switch can operate in circuits with voltages up to and including 600 $V_{rms}$.

9. The electrical switch of claim 1, wherein the maximum current conducted by each individual point is up to 1.4 A.

10. The electrical switch of claim 1, wherein the contact surface comprising a plurality of contact points is comprised of at least one of silver, tungsten, molybdenum, nickel, cadmium, carbon, silver tin oxide, silver cadmium oxide, silver tungsten, silver tungsten carbide, and silver carbide.

11. The electrical switch of claim 1 wherein said dielectric layer is resiliently flexible.

* * * * *